United States Patent
Lord

(10) Patent No.: US 8,239,462 B2
(45) Date of Patent: Aug. 7, 2012

(54) METHOD AND SYSTEM FOR COMPOSING ELECTRONIC MESSAGES

(75) Inventor: Robert Lord, San Jose, CA (US)

(73) Assignee: Red Hat, Inc., Raleigh, NC (US)

( * ) Notice: Subject to any disclaimer, the term of this patent is extended or adjusted under 35 U.S.C. 154(b) by 86 days.

(21) Appl. No.: 11/897,606

(22) Filed: Aug. 31, 2007

(65) Prior Publication Data

US 2009/0063641 A1 Mar. 5, 2009

(51) Int. Cl.
*G06F 15/16* (2006.01)
*G06F 15/173* (2006.01)
*G06F 15/177* (2006.01)

(52) U.S. Cl. ....................................................... 709/206

(58) Field of Classification Search .................... 709/206
See application file for complete search history.

(56) References Cited

U.S. PATENT DOCUMENTS

| | | | |
|---|---|---|---|
| 6,816,887 B1 | 11/2004 | Shaw et al. | |
| 6,826,596 B1 | 11/2004 | Suzuki | |
| 7,155,483 B1 | 12/2006 | Friend et al. | |
| 7,222,157 B1 * | 5/2007 | Sutton et al. | 709/206 |
| 2003/0110227 A1 * | 6/2003 | O'Hagan | 709/206 |
| 2004/0044735 A1 | 3/2004 | Hoblit | |
| 2004/0073616 A1 | 4/2004 | Fellenstein et al. | |
| 2004/0148359 A1 | 7/2004 | Ahmed et al. | |
| 2005/0027779 A1 | 2/2005 | Schinner | |
| 2005/0108351 A1 | 5/2005 | Naick et al. | |
| 2005/0144157 A1 | 6/2005 | Moody et al. | |
| 2006/0031324 A1 | 2/2006 | Chen et al. | |
| 2006/0041626 A1 | 2/2006 | Chen et al. | |
| 2006/0129592 A1 | 6/2006 | Poozhiyil et al. | |
| 2006/0161849 A1 | 7/2006 | Miller | |
| 2006/0277263 A1 * | 12/2006 | Daniels et al. | 709/206 |
| 2008/0109462 A1 | 5/2008 | Adams et al. | |
| 2008/0133673 A1 | 6/2008 | Abdelhadi et al. | |
| 2009/0063640 A1 | 3/2009 | Lord | |
| 2009/0063642 A1 | 3/2009 | Lord | |

FOREIGN PATENT DOCUMENTS

EP 1689137 A1 * 8/2006

OTHER PUBLICATIONS

Red Hat Office Action for U.S. Appl. No. 11/897,568, mailed Jul. 8, 2009.
Red Hat Office Action for U.S. Appl. No. 11/897,656, mailed Mar. 18, 2010.
Red Hat Office Action for U.S. Appl. No. 11/897,568, mailed Jan. 22, 2010.
Red Hat Office Action for U.S. Appl. No. 11/897,568, mailed Aug. 2, 2010.
Red Hat Office Action for U.S. Appl. No. 11/897,656, mailed Jul. 20, 2010.

(Continued)

*Primary Examiner* — Haresh N Patel
*Assistant Examiner* — Chau Le
(74) *Attorney, Agent, or Firm* — Lowenstein Sandler PC

(57) ABSTRACT

A method and apparatus for composing electronic messages. In one embodiment, the method includes dividing a first electronic message into one or more segments, uniquely identifying each of the segments of the first electronic message, and storing the first electronic message in a repository with unique identifiers of the segments. The segments can then be individually accessible by a user viewing the first electronic message.

17 Claims, 21 Drawing Sheets

COMPOSING ELECTRONIC MESSAGES

OTHER PUBLICATIONS

Red Hat Office Action for U.S. Appl. No. 11/897,656, mailed Mar. 22, 2011.
Red Hat Office Action for U.S. Appl. No. 11/897,568, mailed Jan. 19, 2011.
Red Hat Office Action for Serial 656 mailed Nov. 1, 2011.
Red Hat Office Action for U.S. Appl. No. 11/897,568, mailed Aug. 8, 2011.

* cited by examiner

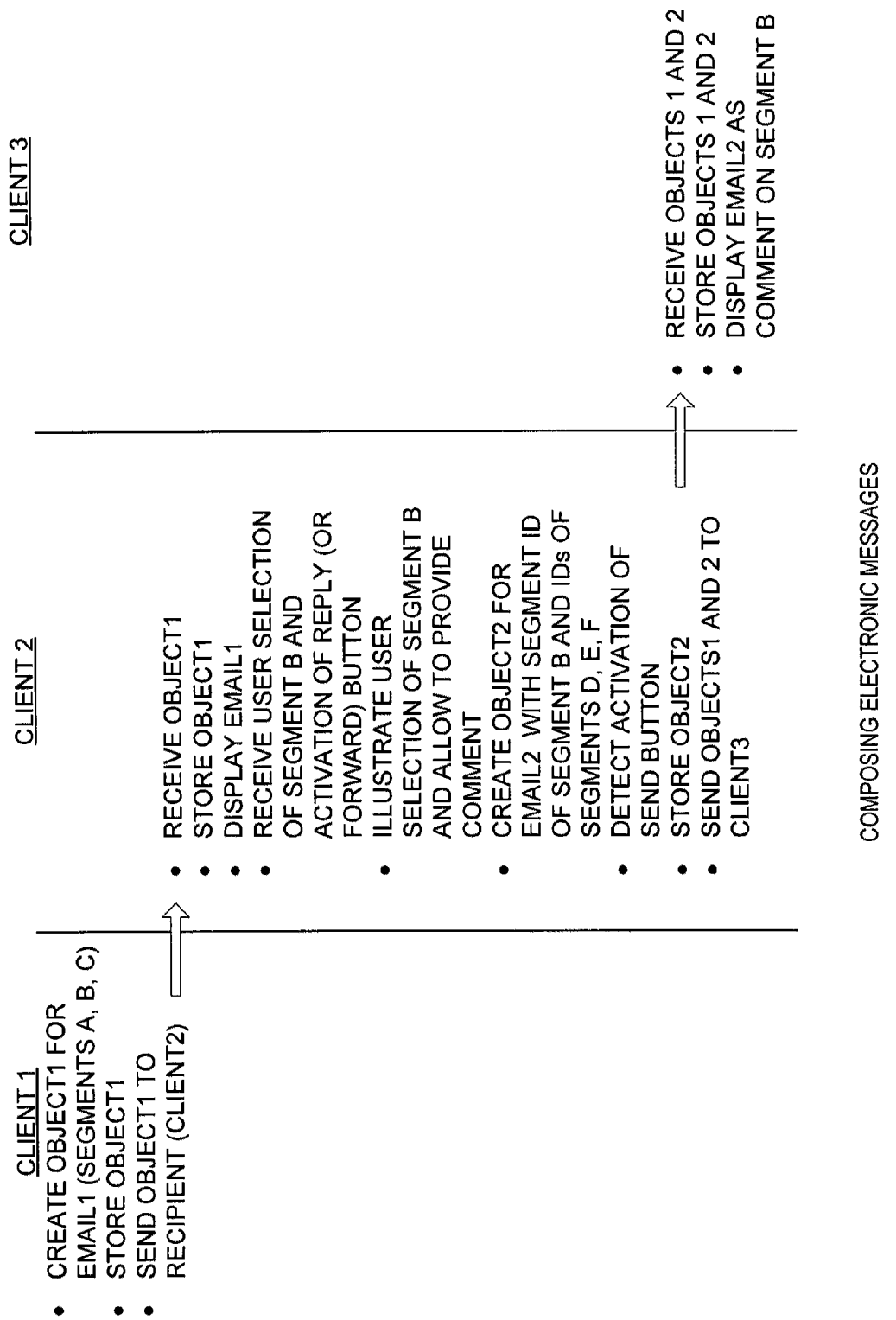

From: Deborah Hoffman [mailto:pestydoc@rcn.com]
Sent: Friday, February 02, 2007 4:28 PM
To: Marina Portnova
Subject: Daniel's birthday party!

Hi Marina!

I may see you tonight, but I wanted to write so that we didn't just talk and forget about the details!

I apologize, but Gabe seems to have misplaced Daniel's invitation! Gabe is usually good about these things; in fact, he told me the day he got the invitation that he had it in his locker. All week he forgot to take it home, and today I asked him to run and get it out of his locker and he couldn't find it...aurgghhh!

I am not even sure of the date, but Gabe would love to attend! Please be so kind as to tell me once again the date, time and place....thank you so much for inviting Gabe!

From: Marina Portnova
Sent: Thursday, August 02, 2007 12:01PM

It's 2/11, 2-5pm, Laser Quest.
Let me know if Gabe needs a ride back home.

See you Saturday!

From: Deborah Hoffman
Sent: Thursday, August 02, 2007 12:04PM

That would be perfect. Thank you so much!

All the best to you for a great weekend,

Debbie Hoffman

FIG. 6B

From: Lisa MacMillen [mailto:lisamacmillen@hotmail.com]
Sent: Wednesday, May 02, 2007 4:45 PM
To: ckosturos@aol.com; a_jenks@msn.com; cnavarro@csus.com; vloesch@covad.net; jillgrossman1@comcast.net; sheritoig@yahoo.com; alexabela@aol.com; kblenko@aol.com; jbelanoff@corcept.com; psteinhardt@comcast.net; bboisseree@yahoo.com; cathie_lesjak@hp.com; cathie.lesjak@hp.com; juliemorrison@aol.com; MomCes@aol.com; schmataman67@comcast.net; wynne@leapfrogventures.com; olcayungun@yahoo.com; kconsidine@csus.com; bobbiegates@yahoo.com; elizabethharris60@comcast.net; verheecke@pacbell.net; marilynabramsdenise@gmail.com; marilynabramsdenise@yahoo.com; bcarlson@co.sanmateo.ca.us; cjhoffman@rcn.com; pestydoc@rcn.com; Marina Portnova; muthaiga@earthlink.net; wwchen@sbcglobal.net; wwwmartha@sbcglobal.net; lisen@prismwork.com; goldenbay8899@aol.com; johntsia@yahoo.com; anne@rudolph5.com; mgdulik@sbcglobal.net; o.lfam5@sbcglobal.net; jlin1@farmersagent.com; clin@nikon.com; julie@kfcomm.com; anne.carswell@pepsico.com; lexagalvin@hotmail.com; suneelakumar@yahoo.com; kumar@visa.com
Subject: FIDDLER ON THE ROOF - Lunch on May 17

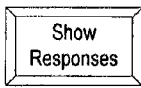

*FIDDLER PARENTS:*

FIDDLER ON THE ROOF goes up on May 17, and we're looking forward to an amazing show. Ms. Mann-Hauer has asked us to plan lunch for the cast and crew that day, so they can eat in the green room between the last run-through in the morning and the first show in the afternoon.

We've ordered yummy sandwiches, and are now looking for volunteers to bring in fruits and veggies, chips and pretzels, drinks and water, and desserts. Below is a list of suggested contributions; please let me know by return e-mail if you can bring something from the list:

**\*Fresh fruit plates [need 5]**

\*Fresh veggie plates with dip [need 3]

\*Chips and pretzels [need 10 bags]

\*Drinks: sports drinks, fruit drinks, iced tea [need 7 12-packs] [no glass, please]

\*Bottled water [need 3 cases of 24]

\*Desserts [need 7-10 dozen] [NO NUTS, PLEASE!]

*We are also looking for one or two parents to set up and supervise the lunch on show day. If you are attending the afternoon performance and can come early (around 11:00 a.m.) to help with this, we'd appreciate it.*

Thanks for all your help, and see you at the show!

From: Lisa MacMillen [mailto:lisamacmillen@hotmail.com]
Sent: Wednesday, May 02, 2007 4:45 PM
To: ckosturos@aol.com; a_jenks@msn.com; cnavarro@csus.com; vloesch@covad.net; jillgrossman1@comcast.net; sheritoig@yahoo.com; alexabela@aol.com; kblenko@aol.com; jbelanoff@corcept.com; psteinhardt@comcast.net; bboisseree@yahoo.com; cathie_lesjak@hp.com; cathie.lesjak@hp.com; juliemorrison@aol.com; MomCes@aol.com; schmataman67@comcast.net; wynne@leapfrogventures.com; olcayungun@yahoo.com; kconsidine@csus.com; bobbiegates@yahoo.com; elizabethharris60@comcast.net; verheecke@pacbell.net; marilynabramsdenise@gmail.com; marilynabramsdenise@yahoo.com; bcarlson@co.sanmateo.ca.us; cjhoffman@rcn.com; pestydoc@rcn.com; Marina Portnova; muthaiga@earthlink.net; wwchen@sbcglobal.net; wwwmartha@sbcglobal.net; lisen@prismwork.com; goldenbay8899@aol.com; johntsia@yahoo.com; anne@rudolph5.com; mgdulik@sbcglobal.net; o.lfam5@sbcglobal.net; jlin1@farmersagent.com; clin@nikon.com; julie@kfcomm.com; anne.carswell@pepsico.com; lexagalvin@hotmail.com; suneelakumar@yahoo.com; kumar@visa.com
Subject: FIDDLER ON THE ROOF - Lunch on May 17

FIDDLER PARENTS:

FIDDLER ON THE ROOF goes up on May 17, and we're looking forward to an amazing show. Ms. Mann-Hauer has asked us to plan lunch for the cast and crew that day, so they can eat in the green room between the last run-through in the morning and the first show in the afternoon.

We've ordered yummy sandwiches, and are now looking for volunteers to bring in fruits and veggies, chips and pretzels, drinks and water, and desserts. Below is a list of suggested contributions; please let me know by return e-mail if you can bring something from the list:

*Fresh fruit plates [need 5]

*Fresh veggie plates with dip [need 3]

*Chips and pretzels [need 10 bags]

*Drinks: sports drinks, fruit drinks, iced tea [need 7 12-packs] [no glass, please]

*Bottled water [need 3 cases of 24]

*Desserts [need 7-10 dozen] [NO NUTS, PLEASE!]

*We are also looking for one or two parents to set up and supervise the lunch on show day. If you are attending the afternoon performance and can come early (around 11:00 a.m.) to help with this, we'd appreciate it.*

Thanks for all your help, and see you at the show!

METHOD AND SYSTEM FOR COMPOSING ELECTRONIC MESSAGES

TECHNICAL FIELD

Embodiments of the present invention relate to data communication, and more specifically, to composing electronic messages.

BACKGROUND

Most business professionals today spend between 20% and 50% of their working time using e-mail: reading, ordering, sorting, 're-contextualizing' fragmented information and of course writing emails. Use of e-mail is increasing due to trends of globalization such as distribution of organizational divisions and outsourcing.

When a user receives an email message and hits a reply button to type a response, an initial message is copied to a mail window buffer, and the user can edit the initial message. For example, the user may delete everything but a single paragraph to which the user wants to respond. The user may then send the response to the sender of the initial message, as well as some other users who were not the recipients of the initial message. Currently, the users who join the email thread late have no way of knowing how the initial message looked like in its original form. In particular, if the initial message was partially erased, they cannot view the erased portions, and even if the initial message looks complete, they cannot be certain that it has not been modified by other recipients.

BRIEF DESCRIPTION OF THE DRAWINGS

The present invention is illustrated by way of example, and not by way of limitation, in the figures of the accompanying drawings and in which:

FIG. 4 illustrates an exemplary email composition process, in accordance with some embodiments of the invention.

FIGS. 6A, 6B and 6C illustrate exemplary user interfaces for presenting threaded messages using sticky notes, according to some embodiments of the invention.

FIGS. 7A and 7B illustrate exemplary user interfaces for presenting multiple responses to a message, according to some embodiments of the invention.

DETAILED DESCRIPTION

Figure 1:
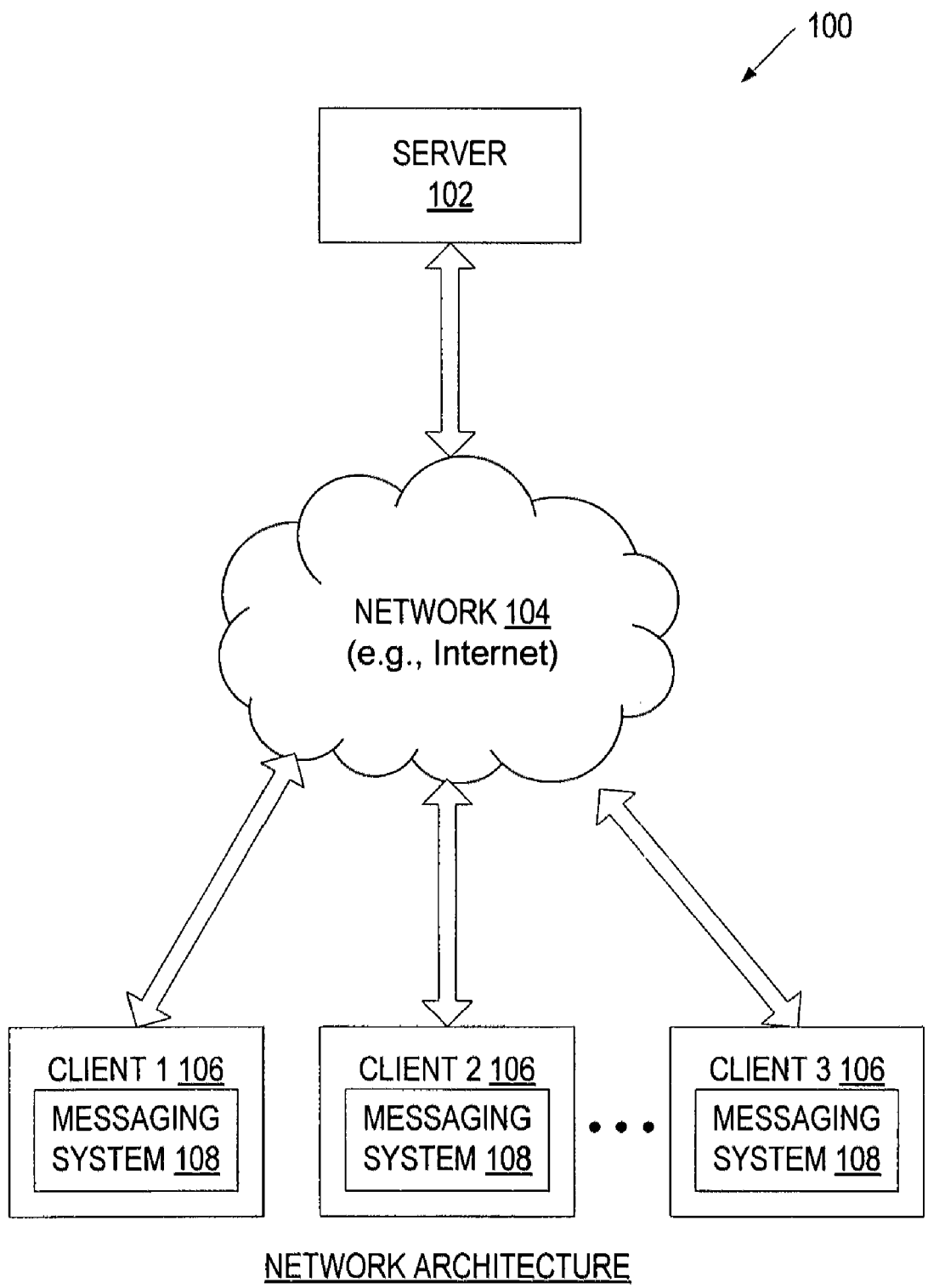
FIG. 1 illustrates a network architecture in which embodiments of the present invention may be implemented.

Described herein is a method and apparatus for composing electronic messages. Electronic messages may include, for example, email messages, instant messaging (IM) communications, blog entries, etc. In one embodiment, a client device divides a first message provided by a user into one or more segments. A segment may be, for example, a message sentence, a message paragraph, a message attachment, an image included in the message, etc. The client device uniquely identifies each segment of the first message and stores the first message with unique identifiers of the segments in a local repository. Subsequently, a user can access the segments individually when viewing the first message. For example, if the user selects a specific segment (by clicking or highlighting it), an indication of the user selection is provided, and the user is allowed to comment on the selected segment, creating a second message. The user can then issue a request to send the second message to one or more recipients. In one embodiment, upon receiving the user request, the client device stores the second message in the local repository in association with the selected segment of the first message, and sends the first and second messages to the intended recipients. The recipients can view the comment on the selected segment of the first message, as well as the first message in its original form.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing", "updating", "maintaining", "determining", "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"); random access memory ("RAM"); magnetic disk storage media; optical storage media; flash memory devices; etc.

FIG. 1 illustrates an exemplary network architecture 100 in which embodiments of the present invention may operate. The network architecture 100 may include client devices (clients) 106, a server 102 and a network 104. The clients 106 may be, for example, personal computers (PCs), mobile phones, palm-sized computing devices, personal digital assistants (PDAs), and the like.

The clients 106 are coupled to the server 102 via the network 104, which may be a public network (e.g., Internet) or a private network (e.g., Ethernet or a local area Network (LAN)). The server 102 provides messaging service to the clients 106. In particular, the server 102 may be a mail server, an instant messaging (IM) server, a blog server, etc.

Each client 106 hosts a messaging system 108 that cooperates with other messaging systems 108 and the server 102 to facilitate exchange of messages between the clients 106. A messaging system 108 is responsible for managing messages (e.g., email messages, IM messages, blog entries, etc.) at a respective client 106. As will be discussed in more detail below, the messaging system 108 divides messages provided by users into segments, stores message with identifiers of segments in a local repository, and allows users to comment on individual segments of the message. The messaging system 108 sends comments on specific segments to intended recipients who can then not only view the comments on the selected segments, but also the original messages from which the segments were selected. The original messages are presented in their initial, unmodified form, and can include a digital signature if it was provided by the author of the original message.

A segment may be a message sentence, a message paragraph, a message attachment, an image included in the message, etc. In one embodiment, the messaging system 108 is configured to specify which message portion should constitute a segment. Such a configuration can be provided by a user or a system administrator, or be predefined.

As will be discussed in more detail below, in one embodiment, the server 102 optimizes the transmission of electronic messages by keeping track of associations between the messages (e.g., which messages were provided as comments on other messages), and transmitting to clients only those messages that are not stored locally at the clients.

Figure 2:
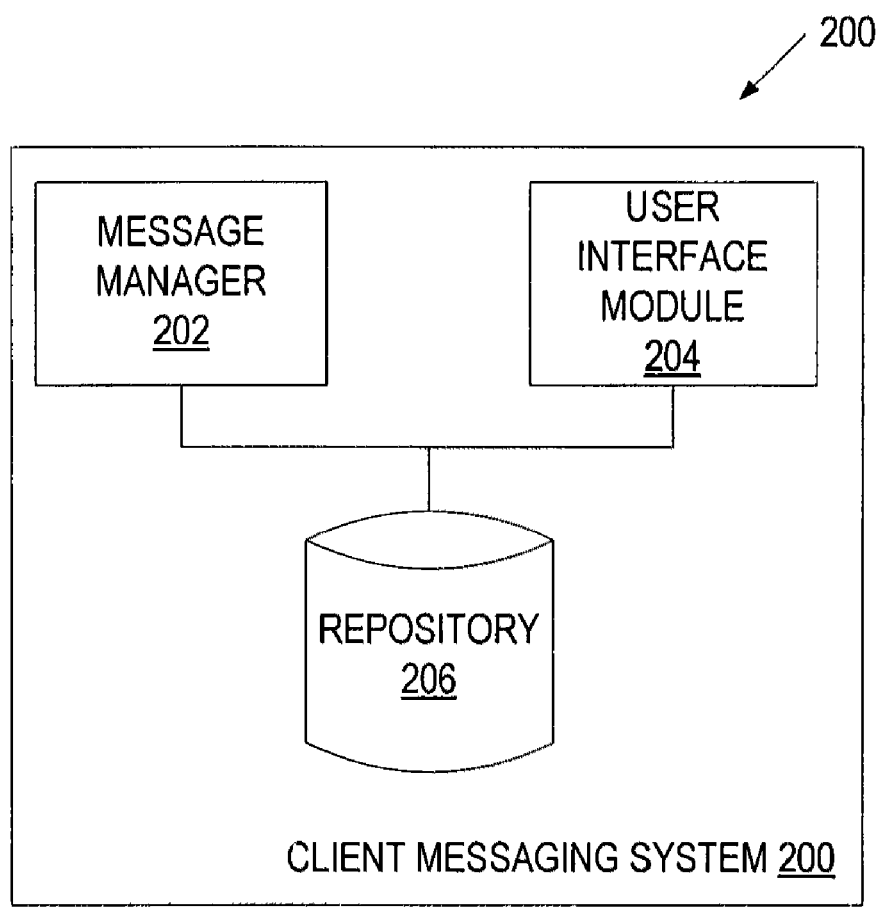
FIG. 2 is a block diagram of one embodiment of a client messaging system.

FIG. 2 is a block diagram of one embodiment of a client messaging system 200. The client messaging system 200 may include a message manager 202, a user interface module 204, and a repository 206. The message manager 202 divides messages provided by a user into segments, assigns unique identifiers to the segments, stores the messages with segment identifiers in the repository 206, and sends messages with segment identifiers to their intended recipients. In one embodiment, each message is stored as an object (e.g., an XML object) containing identifiers of corresponding segments and having an identifier of the message. When a user requests to enter a new message as a comment on a specific segment of an existing message, the message manager 202 creates an object for the new message, adds the ID of the specific segment of the existing message to the object of the new message, and divides the new message into segments. Upon receiving a send request from the user, the message manager 202 stores the object of the new message locally, and sends the objects of the existing and new messages to the recipients of the new message. In one embodiment, if the user digitally signs the message, the digital signature is included in the object of the message.

The repository 206 stores all messages received or originated at the client device. The messages are stored with identifiers of segment IDs contained in respective messages. In addition, when messages relate to other messages or specific segments of other messages, the associations between messages and/or message segments are stored in the repository 206. As discussed above, in one embodiment, the repository 206 stores messages as objects (e.g., XML objects, SGML objects, etc.). Each object may have an object ID and segment IDs of segments contained in the object. In addition, if the object relates to (e.g., includes a comment on) other segments and messages, the object may include IDs of these segments and messages.

In one embodiment, the message exchange process is optimized to minimize the number of transmitted messages. As will be discussed in more detail below, in this embodiment, the new message may be sent to the message manager 202 with the dependency chain information compiled by a server (e.g., server 102). The dependency chain information specifies messages to which the current message relates (e.g., using object IDs of these messages). Upon receiving a new message with dependency chain information, the message manager 202 determines which of the messages specified in the dependency chain are not stored in the repository 206, and sends a request for those messages to the server. Upon receiving the requested messages from the server, the message manager 202 stores them in the repository 206.

The user interface module 204 provides graphical user interfaces (GUIs) to present messages to the user. A GUI allows a user to select individual segments in the message and provide comments on the individual segments. In one embodiment, the GUI displays the selected segment without displaying the entire message, and graphically illustrates that the comment relates to the selected segment (e.g., by highlighting the selected segment, placing brackets around the selected segment, etc.). The GUI may also provide a control (e.g., a button) allowing a user to view the entire message in its original (unmodified) form. In another embodiment, the GUI displays the comment as a note (e.g., a sticky note) added to the message and positioned next to, or on top of, the selected segment in the message, where the content of the message is displayed in its original form. The GUI may also provide a control allowing a user to view all messages or comments related to a specific segment of the message, and may display all the related messages or comments as notes positioned next to, or on top of, the specific segment.

In one embodiment, in which the original message has been signed by its author, the GUI notifies the viewer that the original message has a digital signature. If the GUI presents to a user a thread of messages and some of the messages have been digitally signed, the user can see which messages have digital signatures.

Accordingly, embodiments of the invention allow users to comment on initial messages without modifying the initial messages. The comments are maintained separately from the initial messages, preserving the originality and separateness of related messages.

Figure 3A:
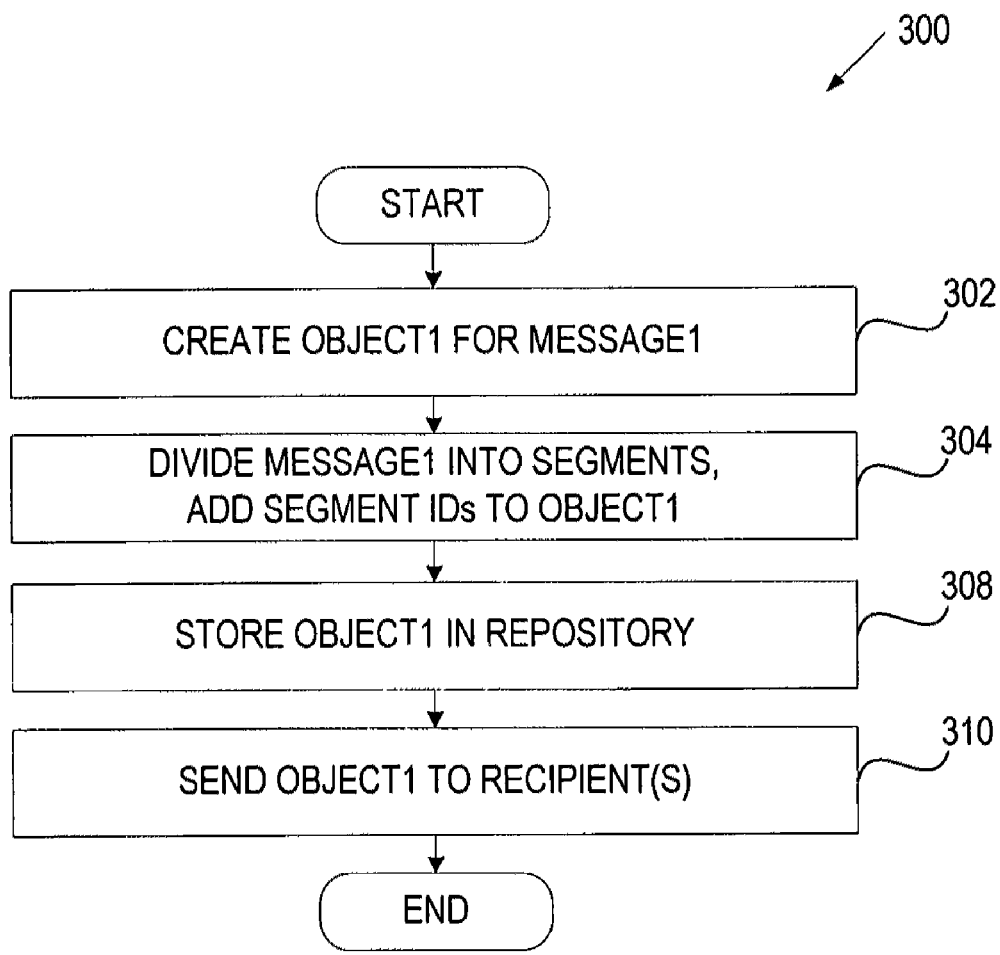
FIG. 3A is a flow diagram of one embodiment of a method for processing a new message at a sender messaging system.

FIG. 3A is a flow diagram of one embodiment of a method 300 for processing a message at a sender's client device. The method 300 may be performed by processing logic that may comprise hardware (e.g., circuitry, dedicated logic, programmable logic, microcode, etc.), software (such as instructions run on a processing device), or a combination thereof. In one embodiment, the method 300 is performed by a client messaging system 108 of FIG. 1.

Referring to FIG. 3A, method 300 begins with processing logic creating object 1 for message 1 and assigning a message ID to message 1 (block 302). Object 1 may be created when the user sends a request to provide a new message (e.g., by activating a new message button). Alternatively, object 1 may be created when the user enters message 1 and submits a request to send message 1 to one or more recipient. Object 1 may be, for example, an XML object, an SGML object, etc.

At block 304, processing logic divides message 1 into segments, assigns a segment ID to each segment, and adds segment IDs to the object of message 1. As discussed above, depending on the configuration, a segment may be a message sentence, a message paragraph, a message attachment, an image within the message, etc. Processing logic may divide message 1 into segments while the user is entering message 1. For example, if a paragraph constitutes a segment, processing logic adds a new segment each time the user hits the enter key to start a new paragraph. Alternatively, processing logic may divide message 1 into segments when the user completes entering message 1 (e.g., when the user hits the send button).

At block 308, processing logic stores object 1 in a local repository. At block 310, processing logic sends object 1 to the intended recipient(s) of message 1.

Figure 3B:
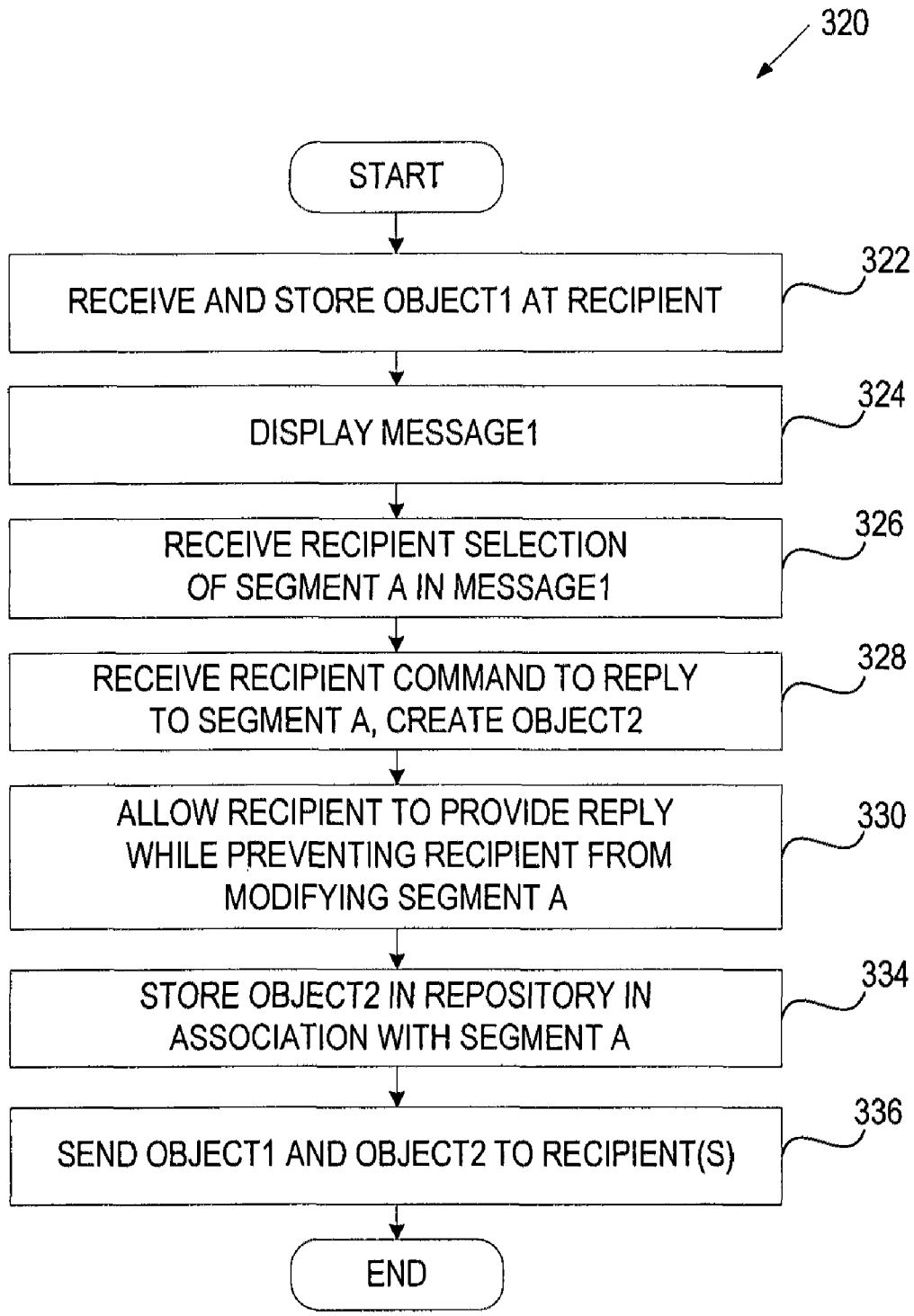
FIG. 3B is a flow diagram of one embodiment of a method for processing a new message at a recipient messaging system.

FIG. 3B is a flow diagram of one embodiment of a method 320 for processing a message at a recipient's client device. The method 320 may be performed by processing logic that may comprise hardware (e.g., circuitry, dedicated logic, programmable logic, microcode, etc.), software (such as instructions run on a processing device), or a combination thereof. In one embodiment, the method 320 is performed by a client messaging system 108 of FIG. 1.

Referring to FIG. 3B, method 320 begins with processing logic receiving and storing object 1 in a local repository of a recipient's client device (block 322). At block 324, processing logic displays message 1 to the recipient.

At block 326, processing logic receives user selection of segment A in message 1. The user may select segment A by activating an indicator (e.g., an icon, paragraph number, etc.) associated with segment A, clicking on segment A, etc. In response, processing logic visually indicates the user selection of segment A on the screen. For example, processing logic may delete everything but the selected segment from displayed message 1 and put brackets around the selected segment, or it may highlight the selected segment, or display it in a different color or with a higher intensity than the rest of the message, etc.

At block 328, processing logic receives a user request to enter a comment for (or a response to) segment A and creates object 2 for the comment. The user request may be received when the user activates a designated button on the screen.

In an alternative embodiment, processing logic first receives the user request to enter a comment, and then allows a user to select a segment for which the comment is to be entered. An exemplary user interface illustrating the above capability with be discussed in more detail below in conjunction with FIG. 5D.

At block 330, processing logic allows the user to enter the comment while preventing the user from modifying the content of segment A. While the user is entering the comment, processing logic identifies segments in the comment, and adds their segment IDs to object 2. In one embodiment, processing logic allows the user to enter the comment in a designated area (e.g., above or below segment A). In another embodiment, processing logic displays a note (e.g., a sticky note) close to, or on top of, segment A and allows the user to enter the comment in the note. In yet another embodiment, processing logic allows the user to enter the comment in a designated area (e.g., above or below segment A), and then adds a note close to, or on top of, segment A and displays the comment in this note.

Upon receiving a user request to send message 2 (the comment on segment A) to one or more recipients, processing logic stores object 2 in the local repository (block 334). Similar to message 1, message 2 includes its message ID, segment IDs of the segments within message 2, and the segment ID of segment A. Further, at block 336, processing logic sends object 1 and object 2 to the recipients of message 2.

FIG. 4 illustrates an exemplary email composition process, in accordance with some embodiments of the invention. In particular, client 1 creates object 1 for email 1. Email 1 includes segments A, B and C specified in object 1 using corresponding segment identifiers. Client 1 stores object 1 in a local repository and sends object 1 to its recipient (user of client 2).

Client 2 receives object 1, stores object 1 in a local repository, and displays email 1 to the user. When client 2 receives the user's selection of segment B in email 1 and detects the user's activation of the reply or forward button, client 2 graphically illustrates that segment B has been selected and allows the user to comment on segment B. In one embodiment, client 2 deletes everything from message 1, except segment B, and displays segment B surrounded by brackets. In another embodiment, client 2 adds a note (e.g., a sticky note) close to, or on top of segment B, for entering the comment.

Upon detecting the user's activation of the reply or forward button, client 2 creates object 2 with segment ID of segment B. As the user enters email 2, client 2 divides email 2 into segments D, E and F, and adds IDs of these segments to object 2. When the user activates the send button, client 2 stores object 2 in the local repository and sends objects 1 and 2 to a recipient of email 2 (client 3).

Client 3 receives objects 1 and 2, stores them in a local repository, and displays email 2 to a user. In particular, in one embodiment, client 3 parses object 2 to determine ID of segment B, extracts segment B from object 1, and displays email 2 as a comment on segment B. In one embodiment, client 3 displays email 2 above or below segment B, without displaying in the entire email 1. In another embodiment, client 3 displays email 3 in a sticky note attached to segment B of displayed email 1. In yet another embodiment, client 3 displays email 1 in its original form, and when the user places the cursor over segment B, client 3 displays email 1 next to, or on top of, segment B (e.g., in a box, sticky note, etc.), with email 1 being visible as long as the cursor remains in the area covering segment B. Once the user moves the cursor outside of this area, email 1 disappears from the screen.

If the user of client 3 desires to see email 1 in its original form, the user can activate a designated control presented on the screen. In response, client 3 retrieves object 1 and displays email 1 in its original form to the user.

Figure 5A:
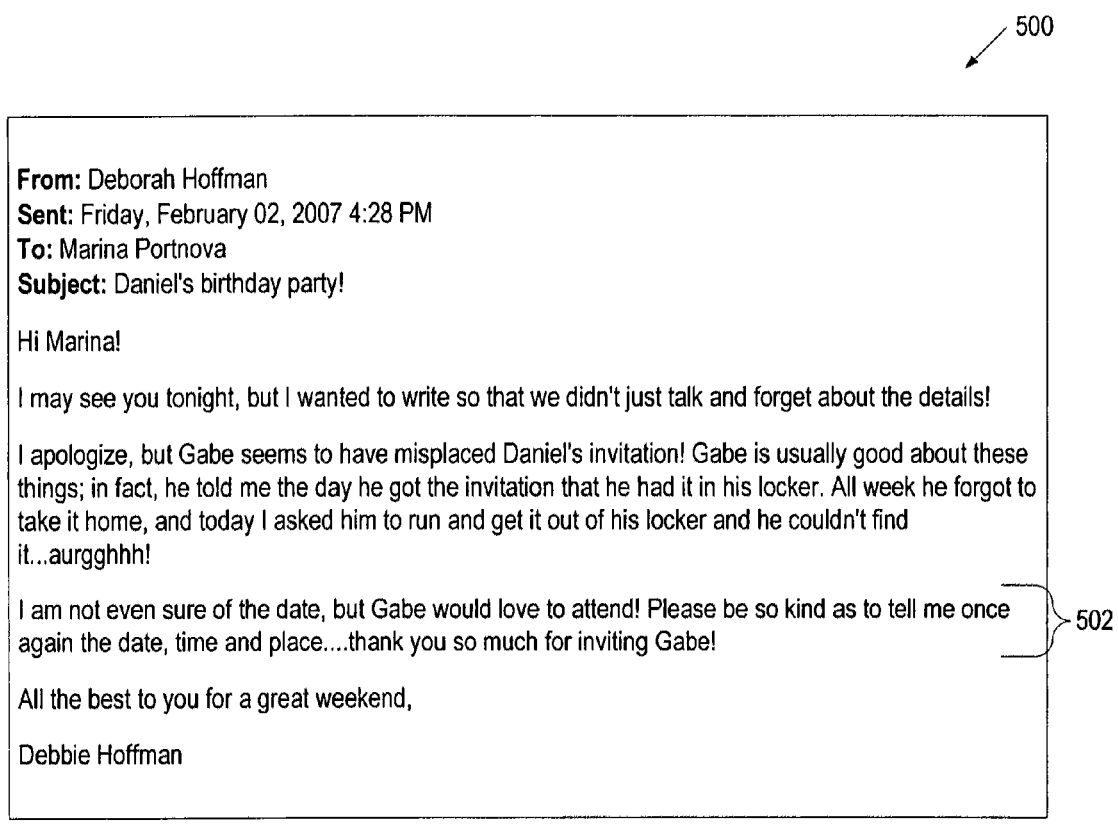
FIGS. 5A, 5B, 5C and 5D illustrate exemplary user interfaces for presenting threaded messages in a reduced format, according to some embodiments of the invention.
Figure 5B:
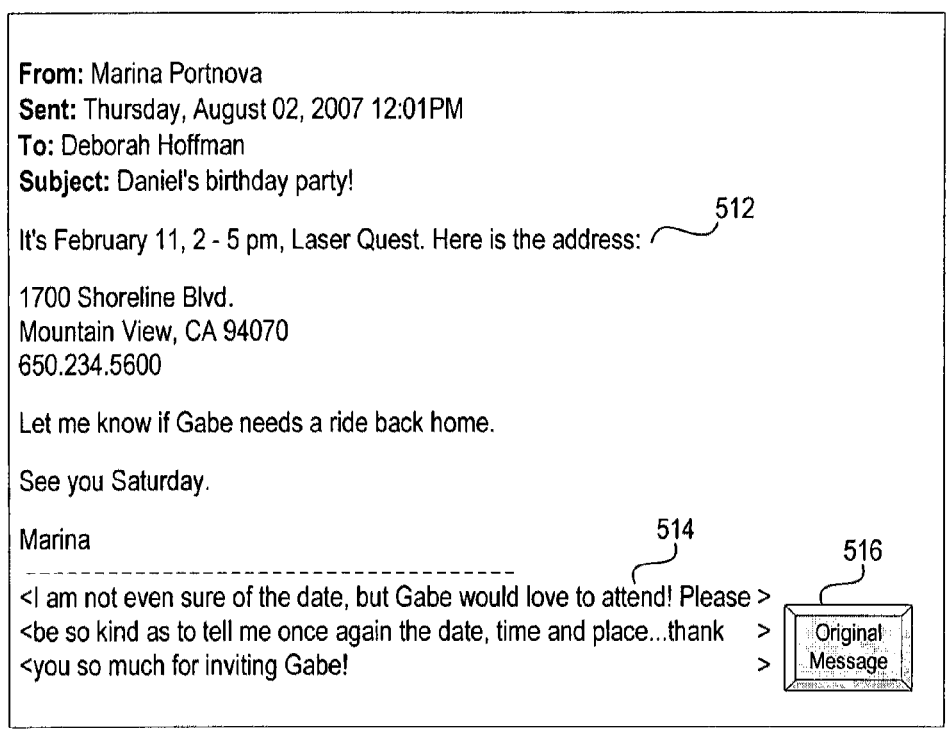
Figure 5C:
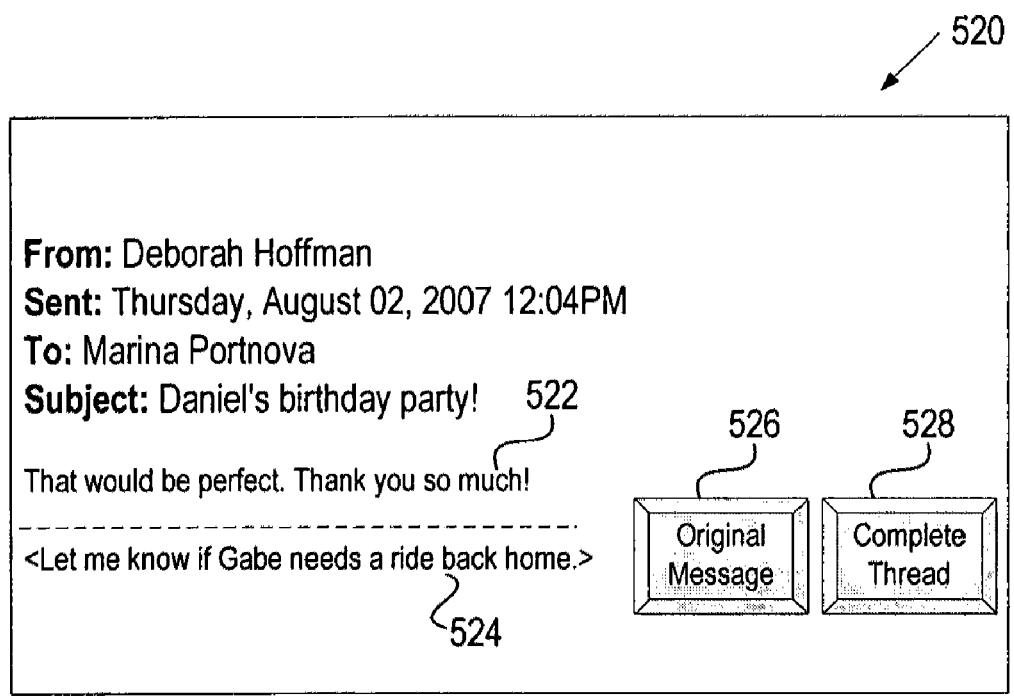

FIGS. 5A, 5B and 5C illustrate exemplary user interfaces (UI) for presenting threaded messages in a reduced format, according to some embodiments of the invention. Referring to FIG. 5A, UI 500 displays an email message 500 presented to a user (e.g., a recipient). If the user wants to comment on a specific segment (e.g., segment 502), the user can select this segment. For example, the user can select segment 502 with a cursor, click (e.g., double click, left-click, right-click) on any portion of segment 502 or an indicator (not shown) associated with segment 503, etc. Once the user selects segment 502 and activates Reply or Forward button (not shown), the message 500 disappears from the screen, leaving only segment 502 surrounded by brackets, and an area is provided on top of segment 502 to enter a comment. The user can then enter a comment and activate Send button to transmit the comment to its intended recipient.

As discussed above, in one embodiment, the client messaging system creates an object for email message 500 and an object for a new email message including the comment, and sends both objects to the recipient. Both objects include their object IDs and IDs of segments included in relevant objects. In addition, the object of the new email message includes the ID of related segment 502.

FIG. 5B illustrates UI 510 displaying the comment to the recipient. In particular, UI 510 presents selected segment 514 and comment 512. UI 510 also includes a button 516 to view the original message. Once the user activates button 516, the original message is presented in its initial, unmodified form. In one embodiment, the client messaging system ensures that the original message is presented in unmodified form by storing the original email as an unmodifiable object and transmitting this object to each participant of the relevant email thread. UI 510 is composed by parsing an object created for comment 512, finding the ID of segment 514, and extracting segment 514 from the object of the original email.

FIG. 5C illustrates UI 520 displaying a comment on another segment to a recipient. In particular, a viewer of UI 510 of FIG. 5B can select segment 524 from comment 512, add a new comment 522, and send the resulting message to the recipient. UI 520 shown in FIG. 5C presents the new message to the recipient and allows the recipient to view the entire comment 512 via the button 526.

UI 520 also includes a button 528 to view a complete thread. In particular, the activation of button 528 causes all messages in the thread to be displayed in their entirety, with graphical indication of associations between messages. For example, the original message 500 may be displayed at the bottom of the screen in black, with segment 514 being displayed in red. Comment 512 may be displayed above message 500, and may also be displayed in red to show association with segment 514. Similarly, segment 524 in comment 512 may be displayed in green, as well as the associated comment 522, which may be displayed above comment 512.

In one embodiment, recreation of original content of messages in the thread is performed using data contained in the objects of messages comprising the tread. As a result, users coming into the thread at any point of time can see original content of all messages in the thread. In one embodiment, if any message in the thread was digitally signed, digital signature information is also presented to the users.

Figure 5D:
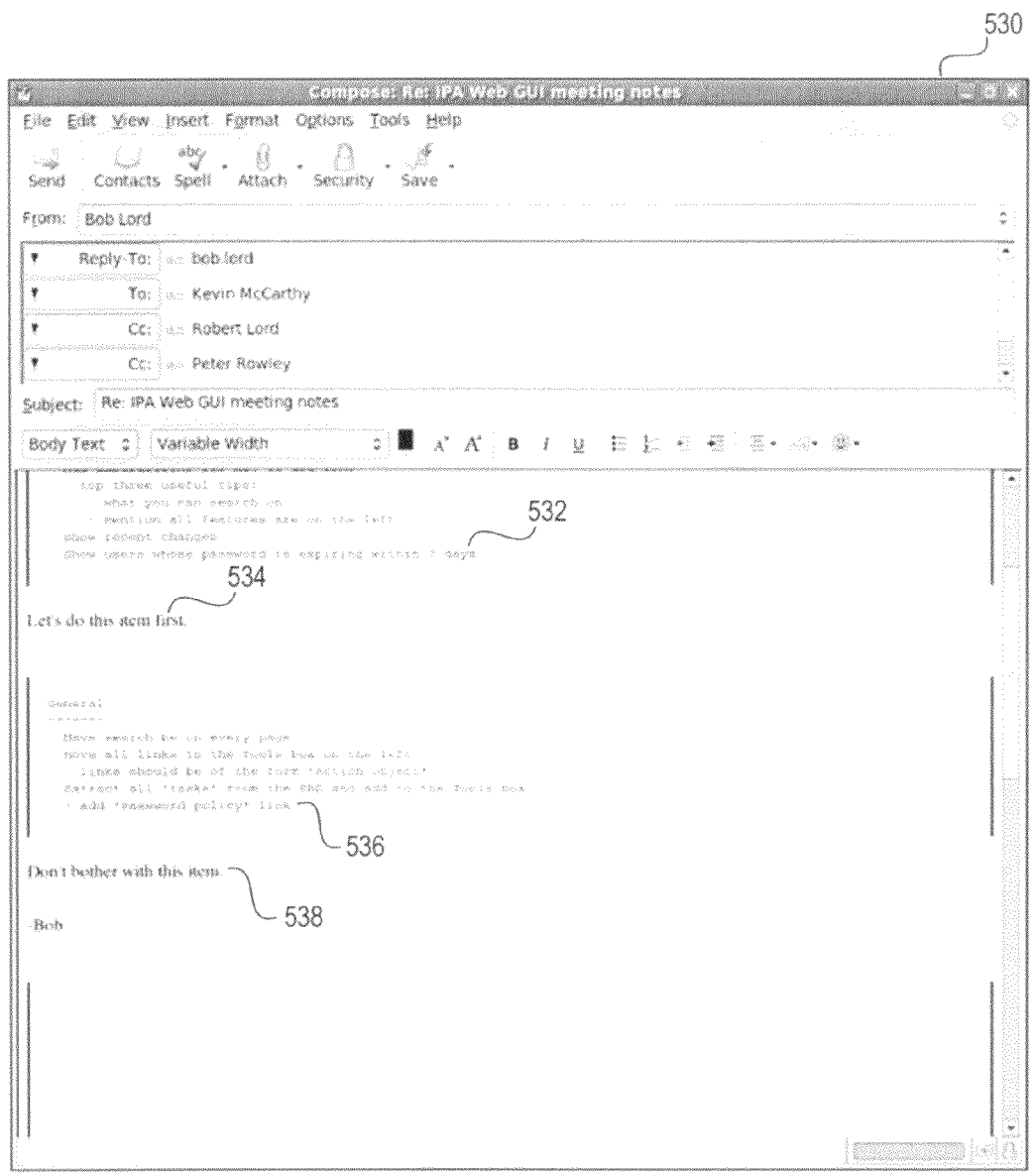

Referring to FIG. 5D, UI 530 illustrates an embodiment, in which the user first hits the reply button and then selects a segment on which to comment. In particular, the user can select segment 532 (e.g., by hitting the enter key when placing the cursor at the end of segment 532, clicking or double-clicking on segment 532, etc.), and provide comment 534 for segment 532. The user can further select segment 536 and provide comment 538 for segment 536. In one embodiment, both comments 534 and 538 are included in the same object in association with IDs of segments 532 and 536 respectively. Alternatively, each of the two comments is included in a separate object in association with a corresponding segment ID.

When the user activates Send button, the object(s) with the comments is (are) transmitted to its intended recipient. When viewing the comments, the recipient may request to view the initial message in its original, unmodified form by activating a designated button presented on the screen (similar to button 516 in FIG. 5B).

Figure 6A:
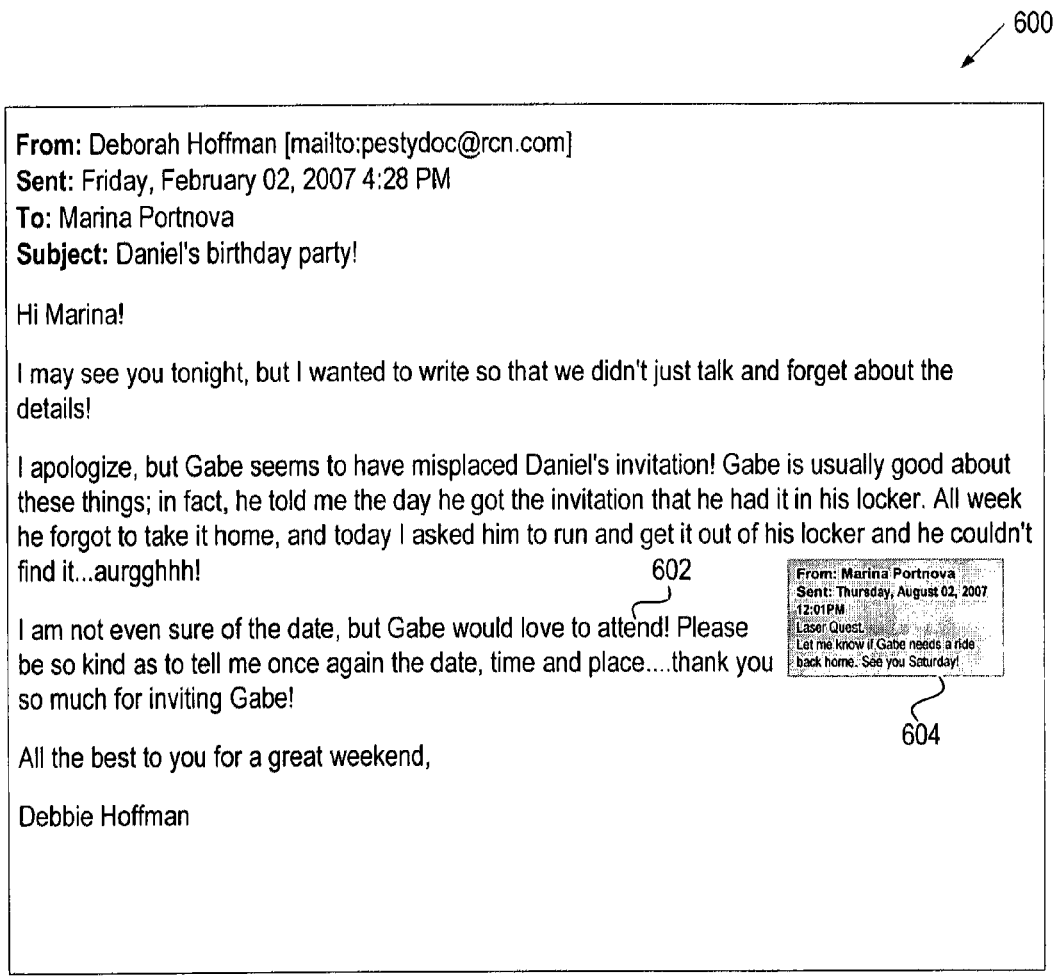
Figure 6C:
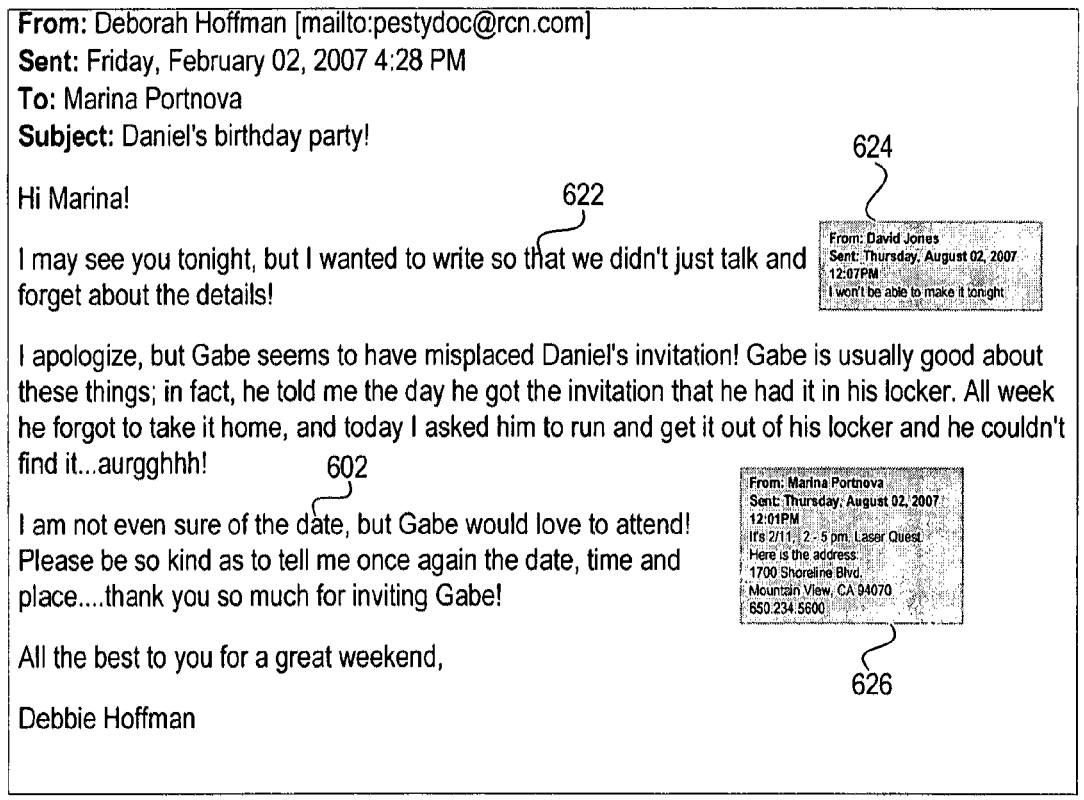

FIGS. 6A, 6B and 6C illustrate exemplary user interfaces for viewing threaded messages using sticky notes, according to some embodiments of the invention. Referring to FIG. 6A, UI 600 presents the initial message including segment 602. Sticky note 604 is attached to segment 602 and includes a comment added to segment 602. In one embodiment, note 604 is displayed in UI 600 temporarily, i.e., only when the cursor is placed in the area covering segment 602. Once the user moves the cursor away from the area, note 604 disappears from the screen. In another embodiment, note 604 is a permanent part of the message displayed in UI 600.

Referring to FIG. 6B, UI 610 presents nested sticky notes. In particular, UI 610 displays the initial message including segment 602 with sticky note 604 added to segment 602. A further comment made to a segment in comment 604 is presented as another sticky note 614 attached to this segment of comment 604. Alternatively, sticky note 604 may only appear while the cursor is placed in the area covering the segment 602, and sticky note 614 may only appear when the cursor is moved to the area of sticky note 604.

Referring to FIG. 6C, UI 620 presents sticky notes added to different segments of the message. In particular, UI 620 displays the initial message including segment 602 with sticky note 626 attached to segment 602, and segment 622 with sticky note 624 attached to segment 622. Hence, the user can see the original content of the initial message as well as subsequent comments made on segments of the initial message by different users.

FIGS. 7A and 7B illustrate exemplary user interfaces for viewing multiple responses to a message, according to some embodiments of the invention. Referring to FIG. 7A, UI 700 presents an original message to a user, and includes a button 704 allowing the user to view all responses or comments provided for the original message. FIG. 7B shows all comments provided by different users on segment 702 of the original message. The comments are presented in the form of sticky notes 712, 714, 716 and 718 positioned in the area of segment 702.

In an alternative embodiment, instead of activating button 704, the user can place the cursor in the area covering the selected segment, and the UI will present all comments pertaining to this segment. The comments will be displayed as long as the cursor is placed in this area. Once the user moves the cursor to the area covering another segment, the previously-displayed comments disappear, and the comments pertaining to the newly selected segment become visible.

In some embodiments, message exchange between clients is optimized by utilizing a server that minimizes amount of data transmitted between clients. In one embodiment, the server maintains information on what clients store which messages. In another embodiment, the server does not maintain such information but rather waits for clients to request messages not stored locally at the relevant clients.

Figure 8A:
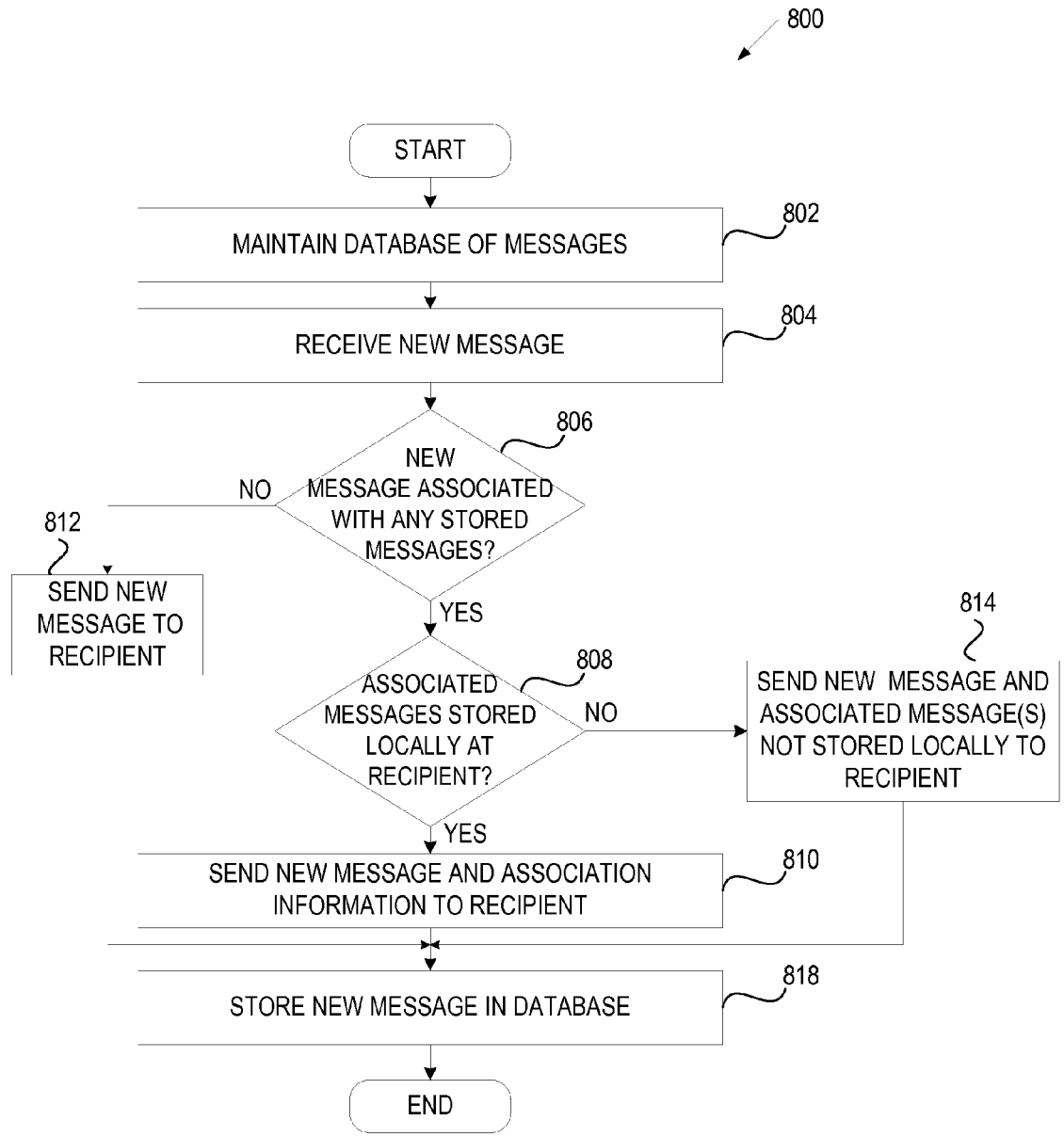
FIGS. 8A and 8B are flow diagrams of two alternative embodiments of a method for server-based optimization of message transmission.
Figure 8B:
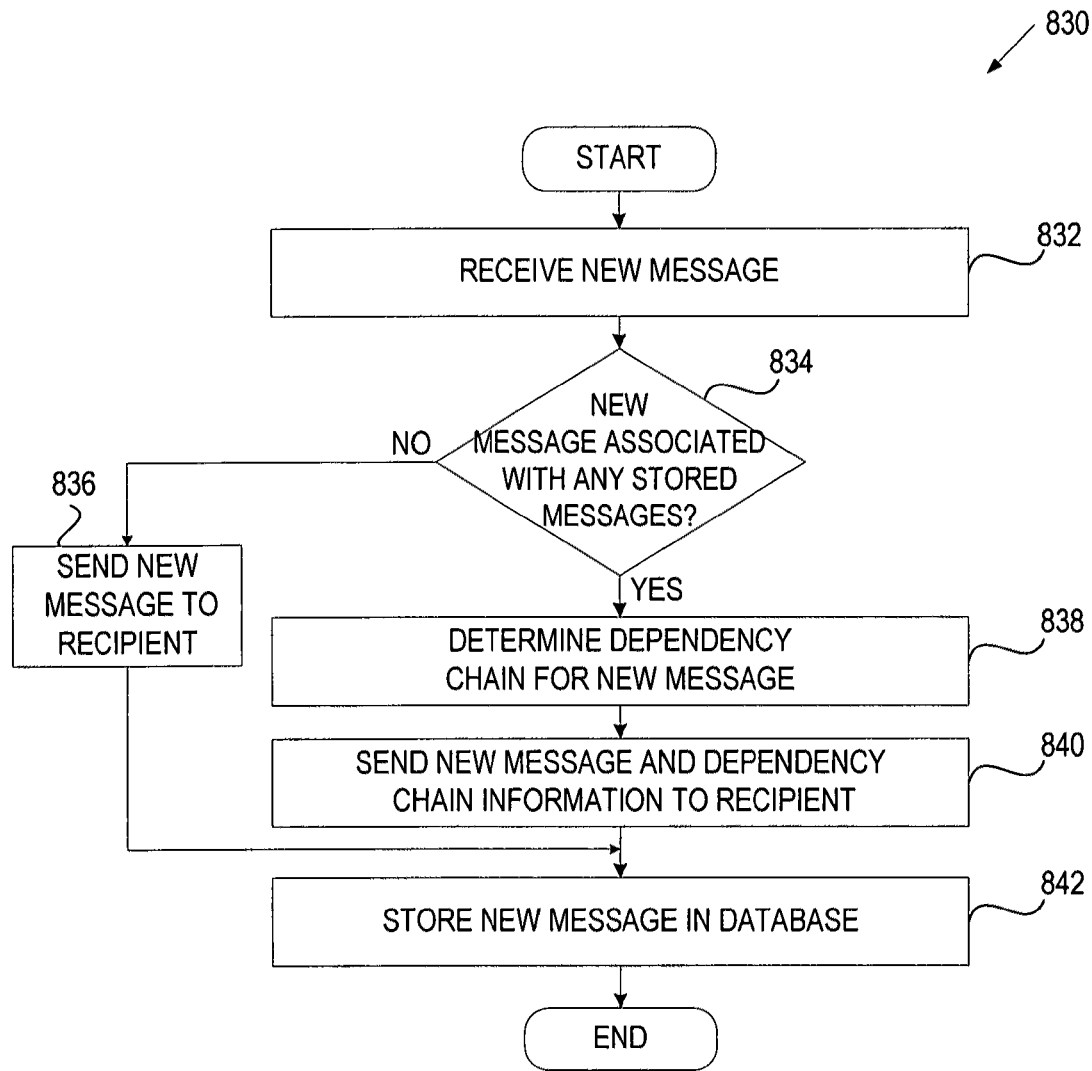

FIGS. 8A and 8B are flow diagrams of two alternative embodiments of a method for server-based optimization of message transmission. The method may be performed by processing logic that may comprise hardware (e.g., circuitry, dedicated logic, programmable logic, microcode, etc.), software (such as instructions run on a processing device), or a combination thereof. In one embodiment, the method is performed by a server 102 of FIG. 1.

Referring to FIG. 8A, method 800 begins with processing logic maintaining a database that stores messages exchanged between different clients (block 802). For each message, processing logic records in the database information on clients that store the message locally. Processing logic may record this information upon receiving a message from a client or transmitting the message to a client. In one embodiment, messages are stored in the database as objects (e.g., XML objects). Each object may include an object ID, IDs of segments contained in a respective message, and IDs of other messages and segments to which the respective message relates if any (e.g., if the message was provided as a comment on another message or a segment of another message).

At block 804, processing logic receives a message from a client and determines that this is a new message that is not stored in the database. The new message may specify a sender and recipient, and may or may not be associated with an existing message (e.g., be a comment on a segment of an existing message). In one embodiment, the client only transmits new messages (messages that are created at the client), and processing logic does not need to determine whether a message received from the client is new. In another embodiment, messages transmitted by the client are not limited to those created at the client; hence processing logic has to determine whether a message received from the client is already stored in the database.

At block 806, processing logic determines whether the new message is associated with any messages stored in the database. In one embodiment, this determination is made based on an associated message ID or associated segment ID contained in the object of the new message. For example, if the new messages is a comment on a segment of an existing message, the object of the new message will include an ID of this segment.

If the new message is not associated with any messages stored in the database, processing logic sends the new message to its intended recipient(s) (block 812), and proceeds to block 818.

If the new message is associated with one or more messages stored in the database, processing logic determines whether the associated messages are stored locally at the recipient(s) (block 808). If all associated messages are stored locally at the recipient(s), processing logic sends only the new message to the recipient(s) (block 810) and proceeds to block 818. As discussed above, the new message may be sent in the form of an object that includes an ID of a message or message segment to which the new message relates.

If not all associated messages are stored locally at the recipient(s), processing logic sends to the recipient(s) the new message and each associated message that is not stored locally at the recipient(s) (block 814) and proceeds to block 818.

At block 818, processing logic stores the new message in the database, along with the information on the message sender and recipient(s) that indicates which clients store this message locally (block 818).

Referring to FIG. 8B, method 830 does not record information on what clients store which messages but instead waits for client to request messages that are not stored locally at the clients. In particular, upon receiving a new message from a client (block 832), processing logic determines whether the new message is associated with any messages stored in the centralized database. In one embodiment, this determination is made based on an associated message ID or associated segment ID contained in the object of the new message. For example, if the new messages is a comment on a segment of an existing message, the object of the new message will include an ID of this segment.

If the new message is not associated with any messages stored in the database, processing logic sends the new message to its intended recipient(s) (block 836), and proceeds to block 818.

If the new message is associated with one or more messages stored in the database, processing logic determines a dependency chain for the new message (block 808). The dependency chain can be determined by finding messages on which the new message depends. Each of the found messages is further examined for dependencies, etc. The dependency chain process ends when no more dependencies of previously found messages exist.

At block 840, processing logic sends the new messages with the dependency chain information to the recipient. At block 842, processing logic stores the new message in the centralized database.

When the recipient's client receives the new message with the dependency chain, it determines which messages specified in the dependency chain are not stored locally, and requests such messages from the server. Upon receiving the messages from the server, the recipient's client can display the original message thread or any individual messages from the thread if requested by the user.

Figure 9A:
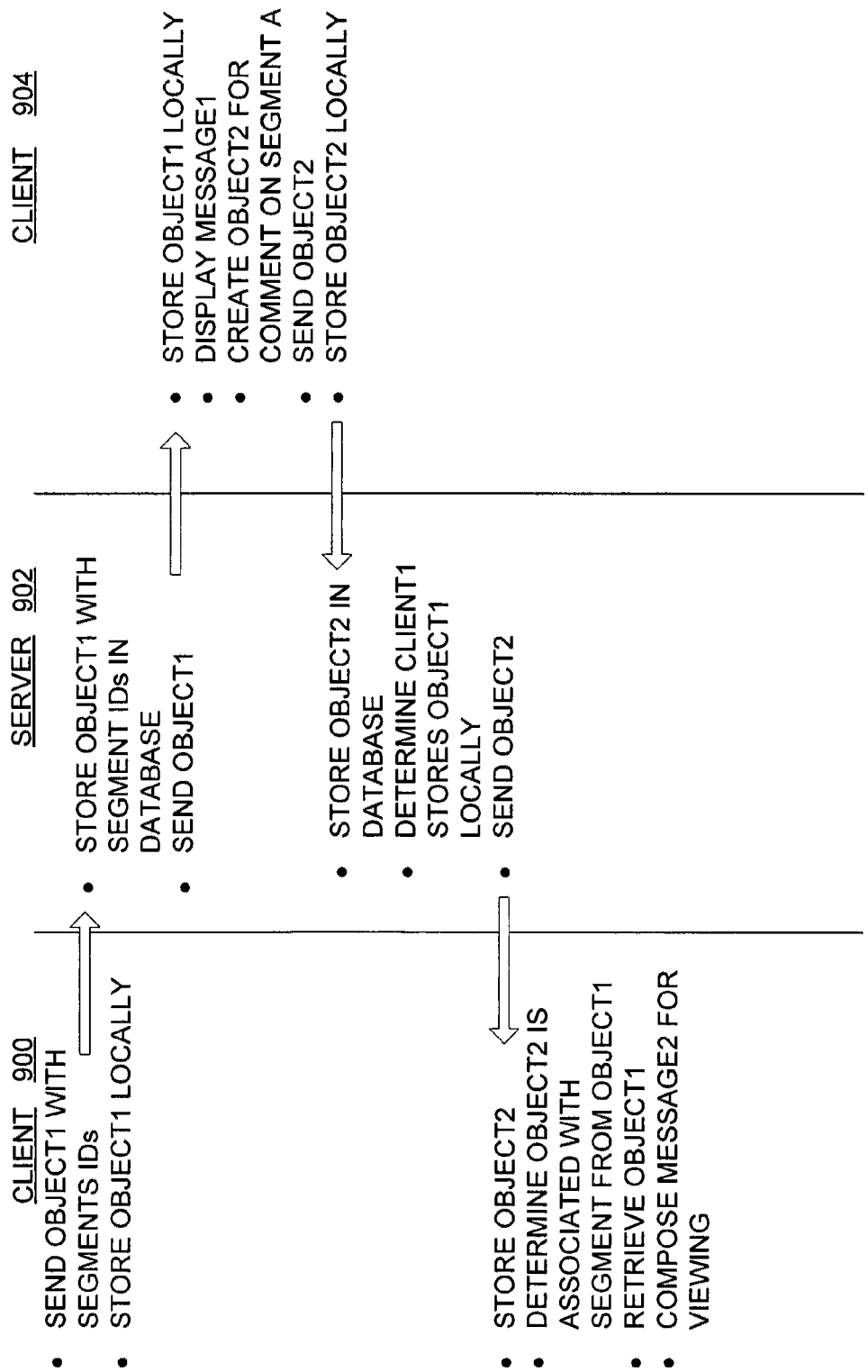
FIGS. 9A and 9B illustrate exemplary server-client message exchange processes, in accordance with two alternative embodiments of the invention.

FIG. 9A illustrates an exemplary server-client message exchange process, in accordance with an embodiment discussed above in conjunction with FIG. 8A. Referring to FIG. 9A, client 900 creates object 1 for message 1, sends object 1 to a message recipient (client 904) via server 902, and stores object 1 in a local repository.

Server 902 receives object 1, stores object 1 in the centralized database, and sends object 1 to client 904. Server 902 also records that object 1 is stored locally at client 900 and client 904.

Client 904 stores object 1 locally and displays message 1 to a user. If the user decides to provide a comment on a segment (e.g., segment A) of message 1, client 904 creates object 2 for the comment and includes ID of segment A in object 2. Client 904 then sends object 2 back to client 900 via server 902, and stores object 2 locally.

Server 902 determines that object 2 is a new object that relates to object 1, and stores object 2 in the centralized database. Server 902 also determines that client 900 stores object 1 locally, and sends only object 2 to client 900. Server 902 also records that object 2 is stored locally at client 900 and client 904.

Client 900 stores object 2 in a local repository and determines that object 2 relates to segment A from object 1. Client 900 retrieves object 1 from the local repository and composes message 2 for viewing. In one embodiment, message 2 includes the comment from object 2, and segment A extracted from object 1. In another embodiment, message 2 includes message 1 with a sticky note attached to segment A, where the sticky note includes the comment from object 2. If the user of client 900 wants to see message 1 in its original form, client 900 retrieves message 1 from its local repository and displays message 1 to the user.

Figure 9B:
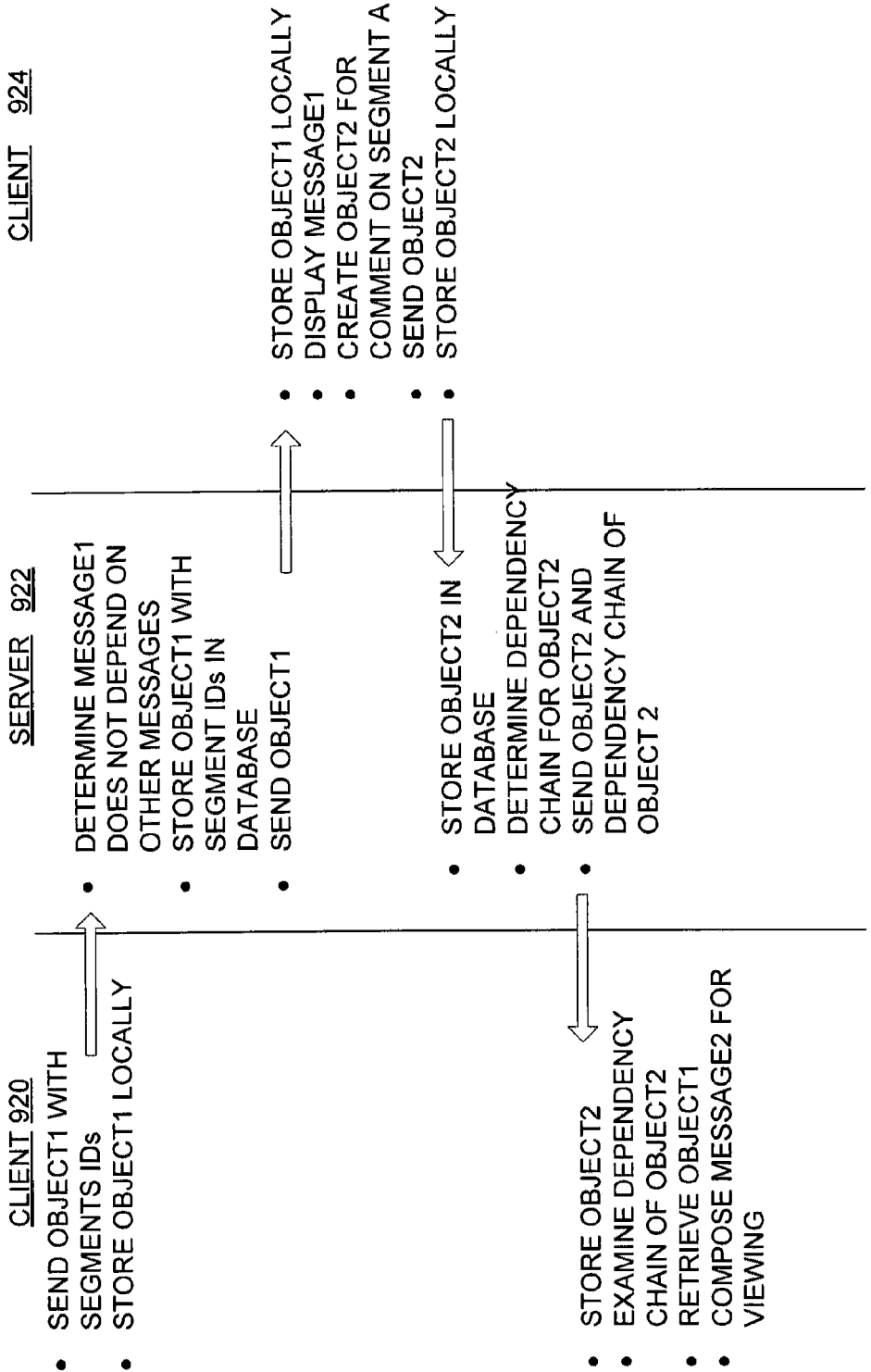

FIG. 9B illustrates an exemplary server-client message exchange process, in accordance with another embodiment discussed above in conjunction with FIG. 8B. Referring to FIG. 9B, client 920 creates object 1 for message 1, sends object 1 to a message recipient (client 924) via server 922, and stores object 1 in a local repository.

Server 922 receives object 1 and parses object 1 to determine whether it relates to another message. Upon determining that message 1 does not depend on any other messages, server 922 stores object 1 in the centralized database, and sends object 1 to client 904.

Client 924 stores object 1 locally and displays message 1 to a user. If the user decides to provide a comment on a segment (e.g., segment A) of message 1, client 924 creates object 2 for the comment and includes ID of segment A in object 2. Client 924 then sends object 2 to client 920 via server 922, and stores object 2 locally.

Server 922 determines that object 2 relates to object 1, and determine a dependency chain for object 2. In particular, server 922 adds the ID of object 1 to the dependency chain, retrieves object 1 from the database, and parses object 1 to determine whether message 1 depends on any other messages. Upon determining that object 1 does not depend on any other messages, server 922 sends object 2 and its dependency chain information to client 920. Server 922 also stores object 2 in the centralized database.

Client 920 stores object 2 in a local repository, and examines the dependency chain information to determine whether it needs to send a request to server 922 for any objects not stored locally at client 920. Upon determining that object 1 is stored locally, client 920 retrieves object 1 from the local repository and composes message 2 for viewing.

In some circumstances, messages pertaining to a user may need to be uploaded from a server to a client messaging system. For example, all messages pertaining to a user may be stored at a server and uploaded to a client messaging system only upon a user request. In another example, messages pertaining to a user may need to be uploaded to a client messaging system when a new client messaging system is installed.

Figure 10:
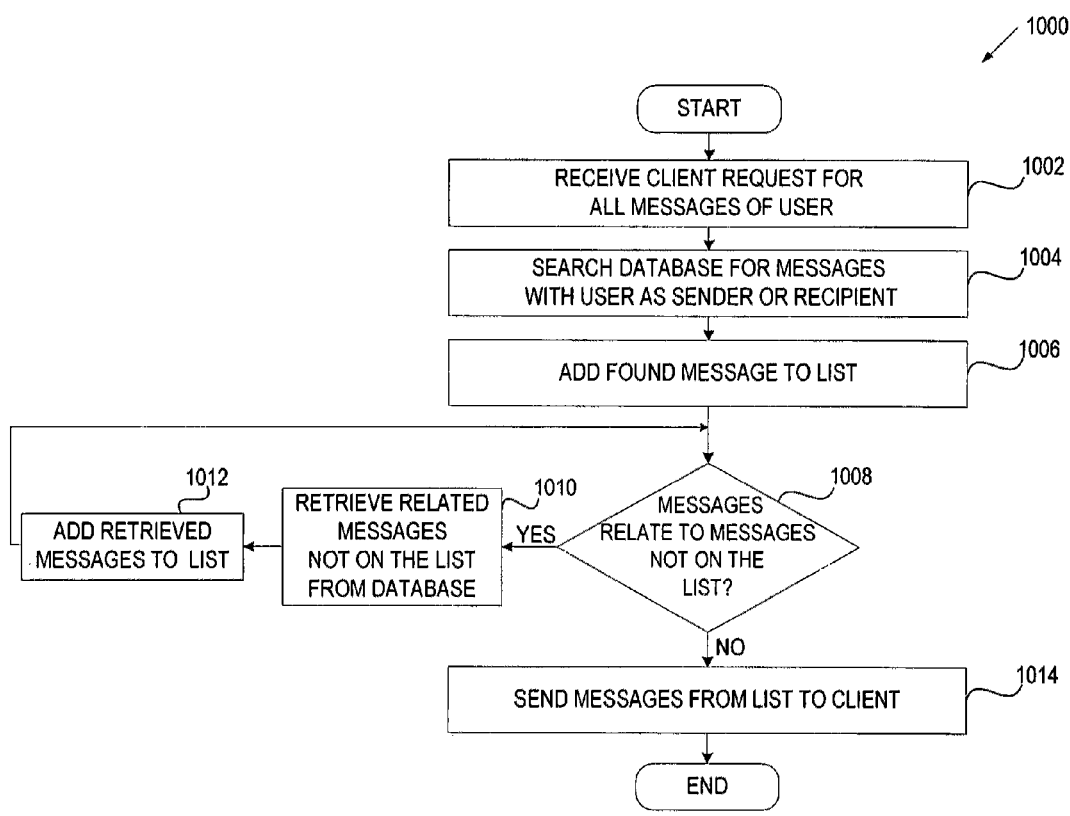
FIG. 10 is a flow diagram of one embodiment of a method for uploading user messages to a client messaging system.

FIG. 10 is a flow diagram of one embodiment of a method 1000 for uploading user messages to a client messaging system. The method 1000 may be performed by processing logic that may comprise hardware (e.g., circuitry, dedicated logic, programmable logic, microcode, etc.), software (such as instructions run on a processing device), or a combination thereof. In one embodiment, the method 1000 is performed by a server 102 of FIG. 1.

Referring to FIG. 10, method 1000 begins with processing logic receiving a client request to upload user messages from a server (block 802). In one embodiment, processing logic authenticates the client to verify that the client is authorized to request user messages.

At block 1004, processing logic searches a centralized database for messages having the user as a sender or a recipient. At block 1006, processing logic adds such messages to a list of user messages.

At block 1008, processing logic examines each message on the list to determine whether this message relates to any other message that is not on the list. If so, processing logic retrieves the related message from the centralized database (block 1010), adds it to the list (block 1012), and returns to block 1008. When all related messages are added to the list, processing logic sends all messages on the list to the client (block 1014).

Figure 11:
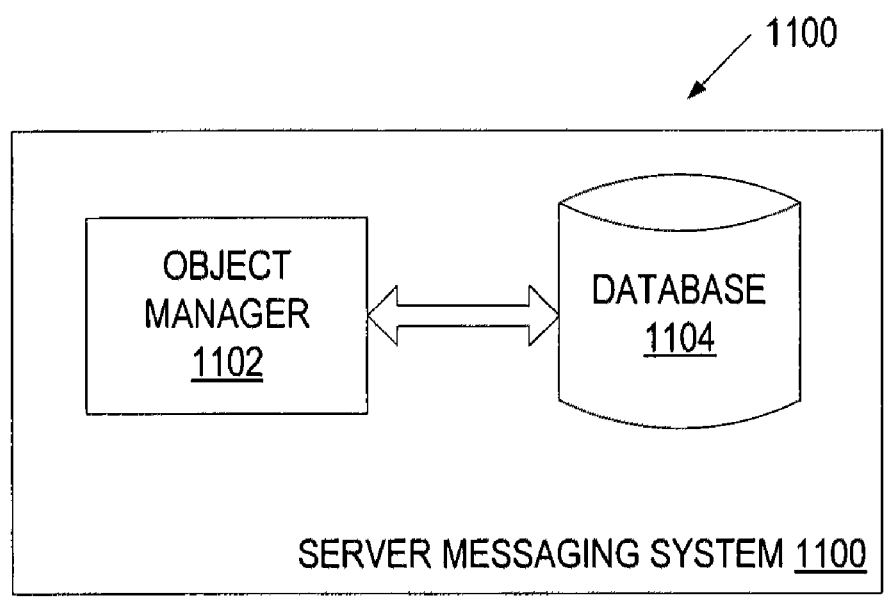
FIG. 11 is a block diagram of one embodiment of a server messaging system.

FIG. 11 is a block diagram of one embodiment of a server messaging system 1100. The server messaging system 1100 may include an object manager 1102 and a database 1104. The database 1101 stores messages exchanged between different clients, as well as information identifying clients that store individual messages locally. In one embodiment, messages are stored in the database 1104 as objects (e.g., XML objects). Each object may include an object ID, IDs of segments contained in a respective message, and IDs of other messages and segments to which the respective message relates if any (e.g., if the message was provided as a comment on another message or a segment of another message).

In one embodiment, the object manager 1102 receives messages from different clients and determines what should be sent to intended message recipients. In particular, the object manager 1192 looks for related messages and sends to the recipients only those related messages that are not currently stored at the respective recipients, thus minimizing the number of transmitted messages.

In another embodiment, the object manager 1102 receives messages from different clients, and determines a dependency chain for each received message. The dependency chain indicates which messages are related to the received message. The object manager 1102 sends the received message with its dependency chain information to the recipient, and waits for the recipient to request messages specified in the dependency chain that are not stored locally at the recipient. Upon receiving a request for such messages, the object manager 1102 retrieves these messages from the database 1104 and sends them back to the recipient.

In one embodiment, the object manager 1102 is also responsible for uploading messages pertaining to a user to a client messaging system. Prior to uploading, the object manager 1102 searches the database 1104 to compile a list of messages for which the user is either a sender or a recipient, and then examines each message on the list to determine whether it has related messages. If it does, the object manager 1102 further examines each related message to determine whether it depends on any other messages. This process continues until none of the examined messages have related messages.

Figure 12:
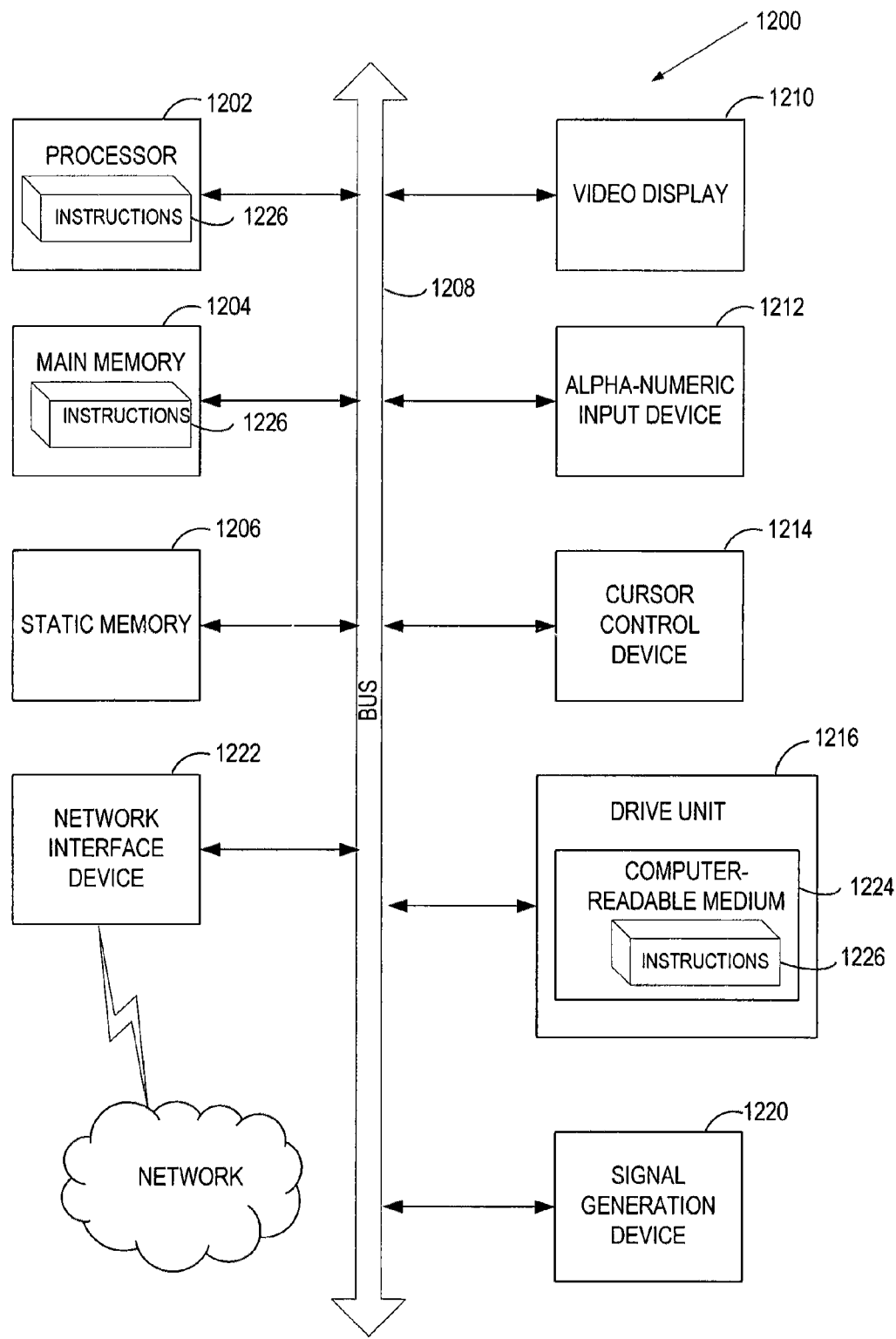
FIG. 12 illustrates a block diagram of an exemplary computer system implementing some embodiments of the present invention.

FIG. 12 illustrates a diagrammatic representation of a machine in the exemplary form of a computer system 1200 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1200 includes a processing device 1202, a main memory 1204 (e.g., read-only memory (ROM), flash memory, dynamic random access memory (DRAM) such as synchronous DRAM (SDRAM) or Rambus DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 1202 is configured to execute the processing logic 1226 for performing the operations and steps discussed herein.

The computer system 1200 may further include a network interface device 1208. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker).

The data storage device 1218 may include a machine-accessible storage medium 1230 on which is stored one or more sets of instructions (e.g., software 1222) embodying any one or more of the methodologies or functions described herein. The software 1222 may also reside, completely or at least partially, within the main memory 1204 and/or within the processing device 1202 during execution thereof by the computer system 1200, the main memory 1204 and the processing device 1202 also constituting machine-accessible storage media. The software 1222 may further be transmitted or received over a network 1220 via the network interface device 1208.

While the machine-accessible storage medium 1230 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
identifying, by a computing system, a first electronic message that is divided into one or more segments, each of the segments of the first electronic message having a unique identifier;
storing the first electronic message in a repository with unique identifiers of the segments;
displaying the first electronic message including the segments to a recipient of the first electronic message in an original form that does not illustrate a division of the first electronic message into the segments;
allowing the recipient of the first electronic message to select any of the segments individually while the first electronic message is being displayed to the recipient of the first electronic message in the original form;
allowing the recipient of the first electronic message to provide a second electronic message to comment on the selected segment of the first electronic message while preventing the recipient of the first electronic message from modifying the selected segment of the first electronic message;
creating an object for the second electronic message;
associating the identifier of the selected segment of the first electronic message with the object of the second electronic message in the repository; and
sending, to a recipient of the second electronic message, an object of the first electronic message and the object of the second electronic message in association with the identifier of the selected segment of the first electronic message, wherein the second electronic message will be displayed to the recipient as a note adjacent to the selected segment of the first electronic message.

2. The method of claim 1 wherein the first electronic message is any one of an email message, an instant message, or a blog entry.

3. The method of claim 1 wherein each segment is any one of a message sentence, a message paragraph, a message attachment, or an image included in the first electronic message.

4. The method of claim 1 wherein storing the first electronic message in the repository comprises:
storing the object for the first electronic message, the object having a message identifier and a unique identifier of each segment of the first electronic message.

5. The method of claim 4 wherein:
the first electronic message is digitally signed; and
the object of the first electronic message includes a digital signature of the first electronic message.

6. The method of claim 1 wherein allowing the recipient of the first electronic message to select any of the segments individually comprises:
receiving a recipient selection of a segment of the first electronic message;
displaying the selected segment; and
receiving a recipient command to comment on the selected segment.

7. The method of claim 6 further comprising:
storing the second electronic message in the repository in association with the selected segment of the first electronic message.

8. The method of claim 1 wherein:
the second electronic message is digitally signed; and
the object of the second electronic message includes a digital signature of the second electronic message.

9. The method of claim 1 further comprising:
receiving a recipient request to view the first electronic message; and
displaying the first electronic message in an original form.

10. A system comprising:
a memory; and
a processor, coupled to the memory, to cause:
a message manager to identify a first electronic message that is divided into one or more segments, each of the segments of the first electronic message having a unique identifier;
a repository, coupled to the message manager, to store the first electronic message with unique identifiers of the segments; and
a user interface module, coupled to the repository, to display the first electronic message including the segments to a recipient of the first electronic message in an original form that does not illustrate a division of the first electronic message into the segments, to allow the recipient of the first electronic message to select any of the segments individually while the first electronic message is being displayed to the recipient of the first electronic message in the original form, to allow the recipient of the first electronic message to provide a second electronic message to comment on the selected segment of the first electronic message while preventing the recipient of the first electronic message from modifying the selected segment of the first electronic message, to create an object for the second electronic message, to associate the identifier of the selected segment of the first electronic message with the object of the second electronic message in the repository, and to send, to a recipient of the second electronic message, an object of the first electronic message and the object of the second electronic message in association with the identifier of the selected segment of the first electronic message, wherein the second electronic message will be displayed to the recipient as a note adjacent to the selected segment of the first electronic message.

11. The system of claim 10 wherein the message manager is further to identify the object for the first electronic message, the object having a message identifier, and a unique identifier of each segment of the first electronic message.

12. The system of claim 10 further comprising:
a recipient messaging system to receive the object of the first electronic message and the object of the second electronic message, and to display the second electronic message as a comment on the selected segment of the first electronic message.

13. An article of manufacture, comprising:
a machine-accessible non-transitory storage medium including data that, when accessed by a machine, cause the machine to perform a method comprising:
identifying, by a computing system, a first electronic message that is divided into one or more segments, each of the segments of the first electronic message having a unique identifier;
storing the first electronic message in a repository with unique identifiers of the segments;
displaying the first electronic message including the segments to a recipient of the first electronic message in an original form that does not illustrate a division of the first electronic message into the segments;
allowing the recipient of the first electronic message to select any of the segments individually while the first electronic message is being displayed to the recipient of the first electronic message in the original form;
allowing the recipient of the first electronic message to provide a second electronic message to comment on the selected segment of the first electronic message while preventing the recipient of the first electronic message from modifying the selected segment of the first electronic message;
creating an object for the second electronic message;
associating the identifier of the selected segment of the first electronic message with the object of the second electronic message in the repository; and
sending, to a recipient of the second electronic message, an object of the first electronic message and the object of the second electronic message in association with the identifier of the selected segment of the first electronic message, wherein the second electronic message will be displayed to the recipient as a note adjacent to the selected segment of the first electronic message.

14. The article of manufacture of claim 13 wherein the first electronic message is any one of an email message, an instant message, or a blog entry.

15. The article of manufacture of claim 13 wherein each segment is any one of a message sentence, a message paragraph, a message attachment, or an image included in the first electronic message.

16. The article of manufacture of claim 13 wherein storing the first electronic message in the repository comprises:
storing the object for the first electronic message, the object having a message identifier and a unique identifier of each segment of the first electronic message.

17. The article of manufacture of claim 16 wherein:
the first electronic message is digitally signed; and
the object of the first electronic message includes a digital signature of the first electronic message.

* * * * *